United States Patent [19]

Dreyer et al.

[11] Patent Number: 4,726,304
[45] Date of Patent: Feb. 23, 1988

[54] SEED DRILL

[75] Inventors: Heinz Dreyer, Hasbergen; Benno Wiemeyer, Lotte-Halen, both of Fed. Rep. of Germany

[73] Assignee: Amazonen Werke H. Dreyer GmbH & Co, KG, Hasbergen-Gaste, Fed. Rep. of Germany

[21] Appl. No.: 791,261

[22] Filed: Oct. 25, 1985

[30] Foreign Application Priority Data

Oct. 27, 1984 [DE] Fed. Rep. of Germany ........ 3439478
Aug. 13, 1985 [DE] Fed. Rep. of Germany ........ 3528960

[51] Int. Cl.$^4$ .............................................. A01C 5/00
[52] U.S. Cl. .......................................... 111/73; 111/85
[58] Field of Search .................. 111/59, 73, 80, 85, 111/86, 7

[56] References Cited

U.S. PATENT DOCUMENTS

| | | | |
|---|---|---|---|
| 1,247,763 | 11/1917 | White | 111/80 |
| 1,473,297 | 11/1923 | Knight | 111/86 |
| 1,908,255 | 5/1933 | Kaupke | 111/73 |
| 2,159,652 | 5/1939 | Brunner | 111/73 |
| 2,221,909 | 11/1940 | Clanin | 111/59 |
| 2,713,836 | 7/1955 | Ajero | 111/80 |
| 2,769,412 | 11/1956 | Holle | 111/85 X |
| 2,884,880 | 5/1959 | Miller | 111/85 |
| 2,924,189 | 2/1960 | McLeod | 111/85 X |
| 3,854,429 | 12/1974 | Blair | 111/73 |
| 4,067,581 | 1/1978 | Kopecky | 111/73 |
| 4,417,530 | 11/1983 | Kopecky | 111/73 |
| 4,565,141 | 1/1986 | Kopecky | 111/73 |
| 4,580,507 | 4/1986 | Dreyer | 111/73 |
| 4,653,412 | 3/1987 | Clarke | 111/86 |

FOREIGN PATENT DOCUMENTS 3216376  3/1983  Fed. Rep. of Germany ........ 111/73

*Primary Examiner*—Richard J. Johnson
*Attorney, Agent, or Firm*—Sprung Horn Kramer & Woods

[57] ABSTRACT

A seed drill has a frame, reservoirs, sowing shares, at least two separate inlets and outlets for two different materials, and a depth-guide or pressure roller behind each sowing share. Variable amounts of one material are conveyed to the forward outlet and of the other material to the rear outlet through separate conductors inside the sowing shares for application of the soil. The outlets are separated along the direction of travel. There is a narrow ripping structure on the forward edge of each sowing share to rip up the soil and produce a furrow. An expansion structure that extends down into the furrow is positioned in the vicinity of the rear outlet of each sowing share. The expansion structure is at least somewhat wider than the ripping structure. The bottom end of the expansion structure is higher than the bottom of the point of the ripping structure.

12 Claims, 24 Drawing Figures

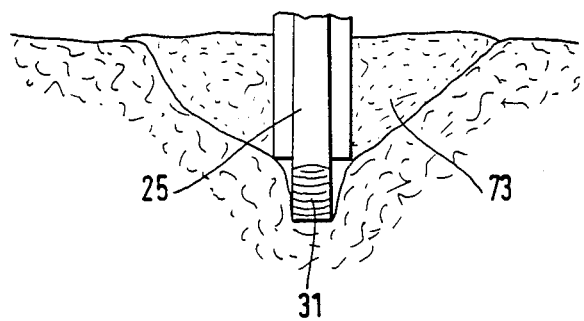
FIG. 12
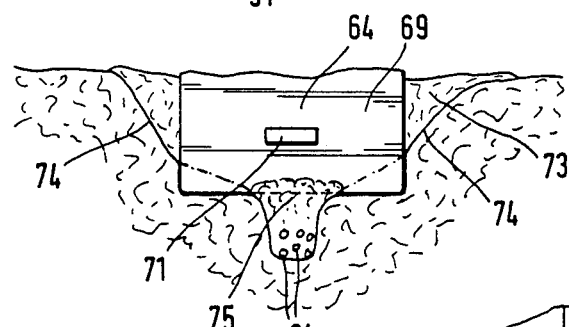
FIG. 13
FIG. 14
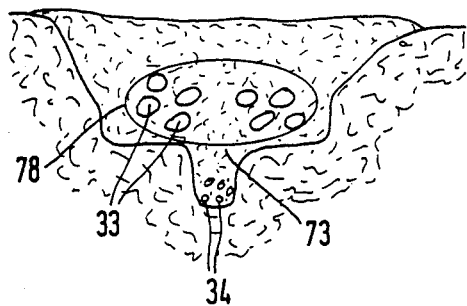
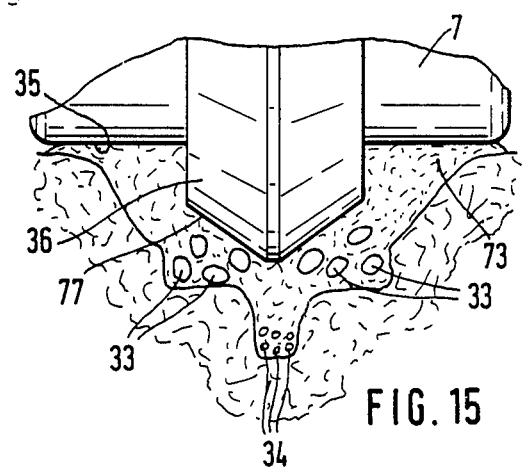
FIG. 15
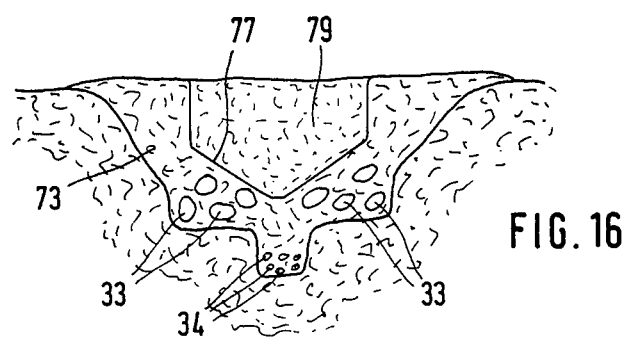
FIG. 16

FIG.20
FIG.21
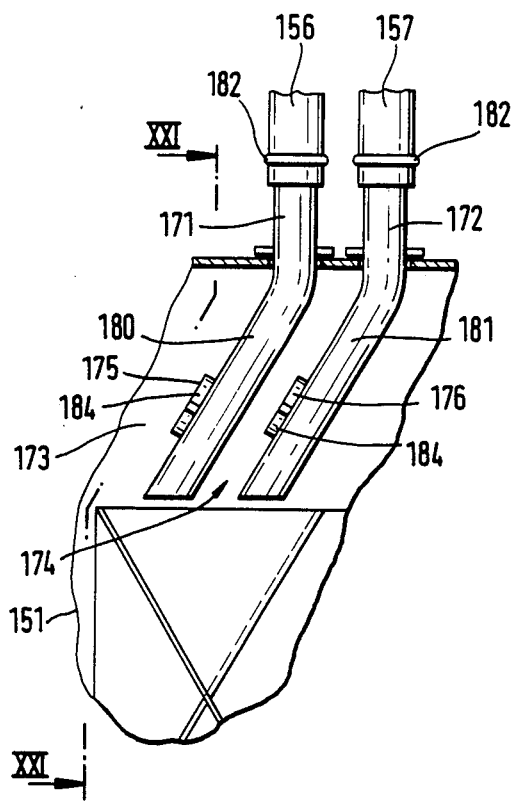
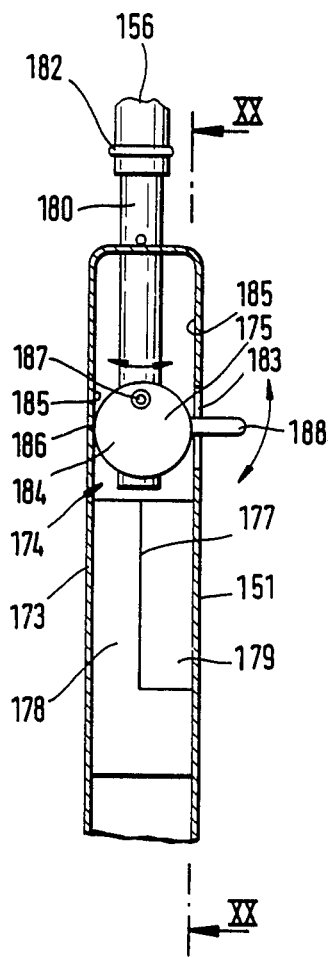

SEED DRILL

BACKGROUND OF THE INVENTION

The present invention relates to a seed drill with a frame, reservoirs, sowing shares at least two separate inlets and outlets for two different materials, and a depth-guide or pressure roller behind each sowing share, with variable amounts of one material being conveyed to the forward outlet and of the other material to the rear outlet through separate channels inside the sowing shares for application in the soil, with the outlets separated along the direction of travel, and with a narrow ripping structure on the forward edge of each sowing share to rip up the soil and produce a furrow.

A seed drill of this type is known from U.S. Pat. No. 4,417,530 and from German OS No. 3 216 375. The sowing share of this seed drill, which is intended for zero tillage, draws a V-shaped furrow in the uncultivated soil. The initial material, either seed or fertilizer, is deposited on the base of the furrow in the narrow cross-section at the point of the V. Once the material has been deposited, the expelled soil flows back into the furrow and covers the material. The second material is then deposited in a ribbon or in two rows in the soil that has flowed back into the furrow. Finally the soil in the furrow and hence the seed and fertilizer is packed down with a smooth pressure roller.

The drawback to this machine is that it is impossible to pack the material initially deposited in the furrow, tightly enough against the soil or to pack down the soil in the furrow firmly enough in the vicinity of the seed. Furthermore, it is impossible, especially if the soil is heavy, to ensure satisfactory separation of the two materials because the soil does not flow back into the furrow fast enough, so that either very little soil separates them or they are deposited together.

A special drawback of the seed drill described in U.S. Pat. No. 4,417,530 is that as a result of the design of the sowing share the soil is dug up very powerfully. Since the pipelines for depositing the second material in two separate rows do not return enough soil before the second material is deposited, and separate deposit of the seed and fertilizer cannot be guaranteed.

The disadvantage of a sowing share known from German Pat. No. 3 332 352 is that the conductor 47 is relatively complicated and can only be manufactured with complicated molds.

SUMMARY OF THE INVENTION

The object of the present invention is to attain a reliably separated deposit of two materials, such as seed and fertilizer, even in heavy soils and especially in zero tillage.

This object is attained in accordance with the invention in that an expansion structure that extends down into the furrow is positioned in the vicinity of the rear outlet of each sowing share, in that the expansion structure is at least somewhat wider than the ripping structure, and in that the bottom end of the expansion structure is higher than the bottom of the point of the ripping structure.

The expansion structure on the sowing share between the forward and rear outlet ensures that the material deposited in the furrow through the first outlet will be covered with soil in such a way that the fertilizer and seed will be separated by a layer of soil even when the soil is very heavy or a lot of soil is thrown up. The expansion structure always pushes at least a little soil ahead, forcing it over the material deposited in the furrow from the first outlet. The material coming from the rear outlet on the sowing share will then always fall on top of the soil covering the first material.

The greatest width A of the expansion structure in one embodiment of the invention can always be at the bottom.

This ensures that the first material will be satisfactorily covered with soil without the floor of the furrow having to be too thick. Furthermore, the width of the expansion structure ensures that the whole bottom of the furrow will be filled with soil.

The expansion structure in one preferred embodiment can be mounted on the sowing share in such a way that it can easily be dismounted.

This makes it possible to mount a special type of expansion structure for each application in order to ensure that enough soil will always be delivered to the bottom of the furrow. The same measure also makes it possible to remove the expansion structure entirely and utilize the sowing share without any in extreme cases where employing an expansion structure would clog up the machine. This allows the farmer to at least continue seeding in emergencies.

The expansion structure can have armor at the bottom of its forward edge in the direction of travel.

An impact structure can be mounted on the rear of the expansion structure.

This ensures that the second material will be deposited in a relatively wide ribbon. The material pouring out of the rear outlet bounces off the impact structure and is broken apart and to the sides, becoming deposited in the furrow in a ribbon.

The impact structure can be designed so that somewhat less material will be deposited along the axis of the ribbon than at its edges. To ensure optimal distribution of the material and allow it to fall laterally into the furrow from the impact structure, the impact structure can be narrower than the expansion structure.

A fender that extends along the direction of travel can be mounted on each side of the expansion structure.

A partition that extends along the direction 20 of travel can be mounted inside the rear outlet.

The partition in this embodiment can taper outward from top to bottom to create two separate rear outlets at a slight distance apart.

This measure separates the two rows slightly farther.

The separate rear outlets can slope at least slightly outward. The partition can be mounted on the expansion structure. The partition can be removed from the sowing share along with the expansion structure. An expansion structure without a partition can be replaced by one with a partition.

To shelter the material pouring out of the rear outlet from the wind, one version of the expansion structure can be raised or lowered into different positions in relation to the point of the ripping structure on the sowing share.

This is the simplest means of ensuring that the material pouring out of the rear outlet will be deposited in a ribbon of two separate rows.

Each roller, which is mounted behind a sowing share can in accordance with the invention have a narrow ring all the way around its bearing surface.

The ring presses a groove into the soil in the furrow while forcing the first material deposited in the furrow against the soil. The material deposited on top is forced down and to some extend spread out by the ring. Additionally and in particular, the first material deposited in the furrow is pressed down. Furthermore, pressing the groove into the soil in the furrow separates the two materials even farther because it is in particular only the middle of the furrow that is forced down. Pressing in the groove also results in only a little soil being left above the first material deposited. Pressing the groove in forces the first material to be deposited down against the soil, whereas the material deposited farther up is essentially forced out to the side and down, sloping downward that is. The groove, which tapers in and down, forces the material deposited on the soil in the furrow down and somewhat to the side, so that almost all of the second material to be deposited will be located beside the first material once the groove has been pressed in. Thus, the material deposited above the first material will in a preferred way be forced down over a width that is greater than that of the sowing share, with the width of the area being forced down decreasing downward. Furthermore, the forced-down area should be wider than the sowing share, which slightly breaks up and loosens the soil to its side.

The roller will be especially simple in design if a continuous ring that is narrower than the roller is positioned on the circumference of the roller. This version is very cost-effective and takes up very little space.

The roller behind the sowing share in another embodiment of the invention is about as wide as the continuous ring and can be raised up and down in relation to the share against the force of a spring, and another roller in the form of a depth-guide roller is mounted on the share.

Since the pressure of the ring in this embodiment is independent of the depth-guide roller, the pressure will always remain constant.

The ring can decrease radially outward in its width B. At least the radially outer portion of the ring can have a wedge-shaped contour. The continuous ring can have a width B that is wider than the width of the rip-up structure of the sowing share. The sides of the narrow ring are initially at least approximately parallel and then taper together as they extend radially outward from the bearing surface of the roller.

Thus, either the edge of the wedge-shaped contour of the narrow ring is sharp or the sloping flanks of the wedge-shaped ring extend along a narrow and blunt continuous pressure ring. Care must be taken to ensure that the narrow and blunt continuous pressure ring is essentially narrower that the material deposited at the top, so that very little material gets forced down. Furthermore the pressure ring should be narrower than the mean particle size of the material being deposited. A ring with a sharp-edged contour will satisfy all these demands.

Conductors for diverting the supply of materials from one outlet to the other of each sowing share can be positioned between the reservoir and the outlets.

This makes it possible for the operator to deposit either the seed on the floor of the furrow and the fertilizer over the seed or the fertilizer on the floor of the furrow and the the seed over the fertilizer, depending on the application and the type of material employed. The same drill and shares can be employed for example, especially in dry areas, to deposit the seed on the floor of the furrow where the soil is more moist and the fertilizer somewhat higher while retaining the forces necessary to drag the shares through the soil within acceptably narrow limits. It will, however, also be possible to deposit the seeds of plants like rape and flax that should be planted relatively shallow on top of the fertilizer on the floor of the furrow. Still, the operator can, when conditions allow or demand, deposit the fertilizer deep on the floor of the furrow and the seed, grain for example, in the furrow above the fertilizer.

Finally, it is possible in accordance with the invention to simplify the design of the conductors by making the conductors be the ends of the supply hoses which can be moved back and forth with controls and secured in at least two positions.

This results in a surprising simple design for adjustable conductors.

Pipes can be associated with the ends of the supply hoses and can be adjusted within each sowing share by the controls. The controls can be a lever that pivots on the pipes and rests against the inner surface of the main share section with the contact surfaces of the lever being at a distance from the point of rotation of the lever. The controls can alternatively be a lever with catches.

Clamping guides with catches for each position of the pipes can be provided inside the main share section. The pin can extend out of the main share section and function as an indicator.

To essentially reduce the risk of blockage, especially of the forward outlet, an extension that extends down into the furrow can be positioned on and can be removed from the rear outlet of each sowing share and the bottom of the extension can extend at least partly beyond the wall of the main share section or ripping structure at one side.

This measure will prevent the forward outlet from getting blocked up, especially when the soil is sticky or heavy, because the rear outlet will be displaced to one side of the forward outlet. Furthermore, the extension on the rear outlet that extends out beyond the main share section at one side will still remain essentially within the basic ripped-up area of soil that occurs naturally as the share rips up the furrow. The extension on the rear outlet will only cut into the solid soil slightly and at the side. Furthermore, the extension on the rear outlet at the side of the main share section will operate only within an area that has been cleared of straw and other harvesting residue on the surface of the soil by the point of the share. Thus, there will be no blockage, and any straw on the surface of the soil will not be entrained by an extension on the rear outlet positioned next to the main share section.

In one preferred embodiment of the invention, the extension can slant out to one side, and the outer slanting wall of its main share section or ripping structure extend out at one side.

This allows the sowing share to be very narrow at the top of the main share section and in the vicinity of the rear outlet, and the main share section to taper out only on one side at the bottom, which the extension opens directly into.

The extension can be at least approximately as wide as the rear outlet in the main share section.

To prevent the rear outlet from getting blocked up even subject to the most difficult conditions, the outer slanting wall of the extension can end at least approximately at a distance V from the bottom of the extension that equals one third of the length W of the extension.

The rear of the extension can have a cover extending over approximately half the length W of the extension.

The bottom of the extension can be at least essentially at one side of the forward outlet along the direction of travel.

To allow the drill to be employed even under the most severe conditions in zero tillage, the extension can be attached to its associated sowing share with a rapid release.

This makes it possible to remove the extension from the share very rapidly even subject to the most difficult conditions.

The rapid release can in a very practical way be a snap-in release and the lever that activates it can consist of the bottom rear of the again share section.

This makes it possible to take the extension into and out of operation very rapidly, whereas the snap-in release or activating lever can be directly integrated into the main share section. The resulting design is especially compact, and the sowing share in accordance with the invention can be very short.

In this case the invention also involves positioning the extension on the main share section in such a way that it can be pivoted to the side or up. Once the extension has been removed or pivoted out, the rear outlet will no longer be in contact with the soil. This is especially important when the drill is employed on heavy and sticky soils. The ability to remove the extension makes it possible to vary the design of the outlets on the sowing share widely. Thus, various types of extension can easily be mounted on the sowing share. The connections can also be very easily replaced, sharpened, repaired, or cleaned.

The snap connection should be positioned as high as possible in the bottom of the main share section.

A bolt can be positioned in the main share section, the front part of a retainer that secures the rapid release can be slipped over the bolt, the rear of the retainer can have a nose or elevation, and a moving, spring-loaded activating lever of appropriate shape that is connected to the rear of the main share section can engage the nose or elevation.

Some preferred embodiments of the invention will now be described with reference to the attached drawings, wherein

BRIEF DESCRIPTION OF THE DRAWINGS

FIG. 12 illustrates how the chisel point of the share digs a furrow in the soil, FIG. 13 is a view along line XIII—XIII illustrating how fertilizer is deposited on the floor of the furrow, FIG. 14 illustrates how fertilizer and seed is deposited in the furrow, FIG. 15 illustrates how the roller presses down the soil in the furrow illustrated in FIG. 14, FIG. 16 illustrates the furrow in FIG. 15 once the groove as been smoothed over with soil, FIG. 20 is a partly sectional view along line XX—XX showing how the conductors are mounted on the share illustrated in FIG. 19 in accordance with the invention, FIG. 21 is a view along line XXI—XXI of the conductors illustrated in FIG. 20.

DETAILED DESCRIPTION OF THE PREFERRED EMBODIMENTS

Figure 1:
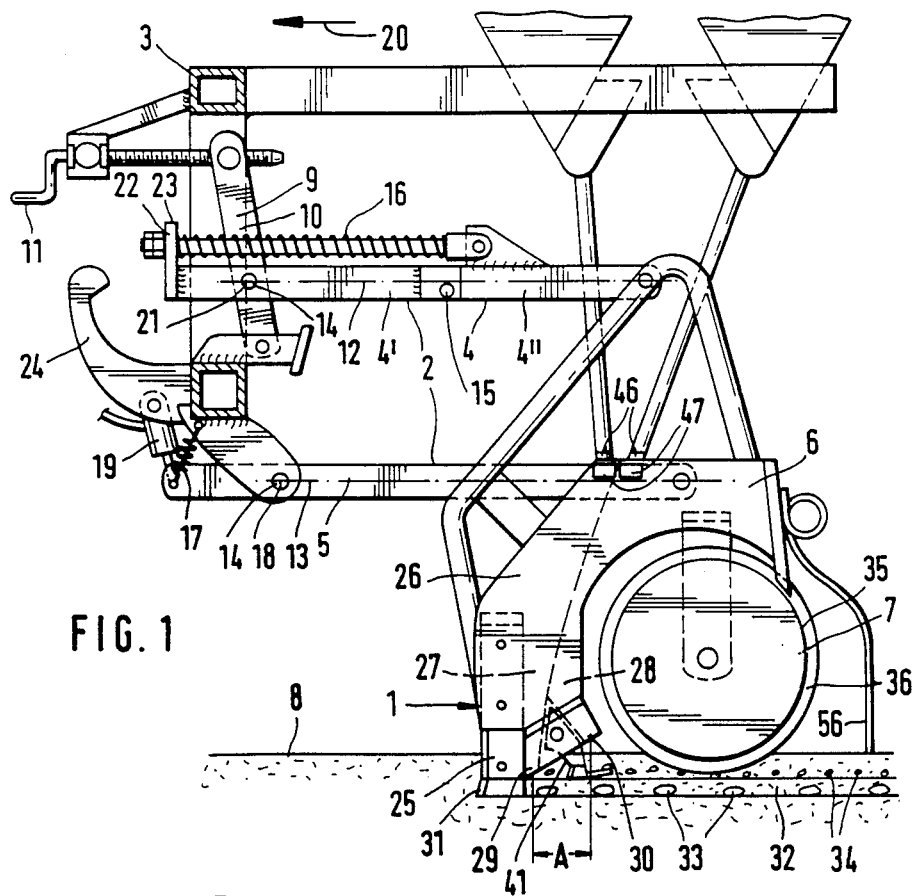
FIG. 1 is a side view of a sowing share and following roller positioned in accordance with the invention on a seed drill.

Sowing shares 1 in the form of chisel shares are mounted in such a way that they can move in a vertical plane on parallelogram mounts 2 on the frame 3 of a seed drill. Each parallelogram mount 2 has an upper strut 4 and a lower strut 5 articulated at the front to frame 3 and supporting a share holder 6 at the rear. Behind sowing share 1 is a depth-guide or pressure roller 7. Roller 7 determines how deep the share can penetrate soil 8. Parallelogram mount 2 is also attached to central controls 9 for varying the depth of penetration of share 1. Upper strut 4 is mounted on a pivoting lever 10 that can be pivoted by means of a spindle 11. The movement of pivoting lever 10 pivots upper strut 4 and hence share holder 6, varying the position of roller 7 in relation to sowing share 1 in order to set different depths of penetration.

The straight lines 12 and 13 that connect the axes 14 that upper 4 and lower struts 5 pivot on are parallel. Since upper strut 4 is divided into strut sections 4' and 4" connected by a point 15 of articulation off of connecting line 12, it is possible for sowing share 1 to swing up and back when it encounters an obstacle in the soil. A resilient element in the form of a compression spring 16 is positioned between strut sections 4' and 4". The spring can be adjusted. It secures upper strut 4 in the normal operating position.

Subject to normal zero-tillage conditions the inherent weight of sowing share 1 is sufficient to force it into soil 8. Still, it has turned out to be practical when the soil contains a lot of stones to position a tension spring 17 on lower strut 5 to exert additional force on sowing share 1 toward soil 8.

A hydraulic cylinder 19 is positioned on the section that extends beyond the forward point 18 of articulation of lower strut 5. The cylinder is employed to lift sowing share 1 out of soil 8 into the non-operating position when the drill is moved from one location to another.

Upper strut 4 also extends beyond point 21 of articulation along the direction 20 of travel. This structure 22 that extends beyond point 21 of articulation is in the form of a stop 23 and acts in conjunction with a hook 24 on frame 3 to keep sowing share 1 lifted when the drill is moved from one location to another. In so doing, the individual shares are lifted by hydraulic cylinder 19 and upper struts 4 pivoted forward by controls 9 until the structure 22 on upper strut 4 that functions as a stop 23 slides under hook 24. If hydraulic cylinder 19 loses pressure while the machine is being moved from one location to another, stop 23 will engage hook 24 and prevent the share from descending.

A chisel 25 is positioned on the edge of sowing share 1 that faces the direction 20 of travel. Inside the main section 26 of sowing share 1 are two separate channels 27 and 28 for seed and fertilizer. Outlets 29 and 30 are separated by a distance A along the direction 20 of travel. Since the point 31 of chisel 25 extends beyond outlets 29 and 30 into soil 8, seed and fertilizer can be unobjectionably deposited in the furrow 32 produced by sowing share 1. Since forward outlet 29, which is intended for seed 33, is aimed directly behind chisel 25, and rear outlet 30, which is intended for fertilizer 34, is aimed farther back, the seed 33 and fertilizer 34 will be deposited separately.

The bottom front of chisel 25 has a downward-pointing point 31. The outer surfaces of chisel point 31 are at least approximately parallel along the direction 20 of travel to help produce a satisfactory furrow 32 for the deposit of seed.

Since the chisel 25 on main share section 26 can be replaced, it can also be reversed when it loses its edge or gets worn down. Different types of chisel 25 can also be employed for different types of seed. The edge of chisel 25 that faces the direction 20 of travel is vertical in order to displace as little soil as possible in producing furrow 32.

Figure 2:
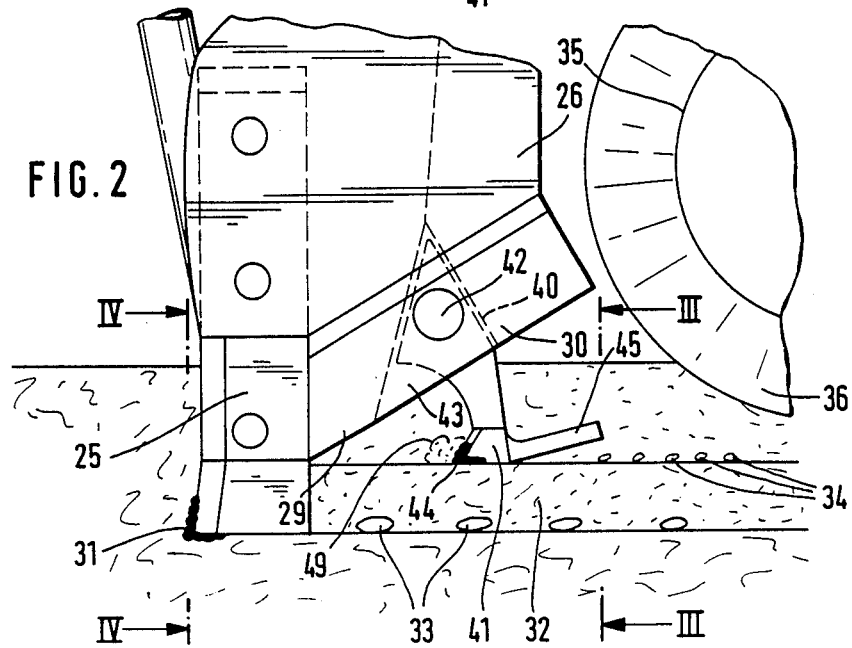
FIG. 2 is a larger-scale view of part of the share illustrated in FIG. 1.

The roller 7 illustrated in FIGS. 1 and 2 is positioned behind sowing share 1 and has a wide bearing surface 35 that rolls along soil 8 above and between furrows 32. Roller 7 accordingly determines how deep sowing share 1 penetrates into the soil and hence the depth of furrow 32. The bearing surface 35 of roller 7 also has a narrow ring 36 around it that decreases radially outward in its width B. Ring 36 is essentially narrower than bearing surface 35 and is positioned along the midplane of and behind sowing share 1 and in the midplane of furrow 32, where it presses down on the soil, in the furrow and on the material, the seed 33 and fertilizer 34, deposited in the furrow.

The radially outer portion of ring 36 has a wedge-shaped contour 37. Wedge-shaped contour 37 can either be sharp-edged or merge into a narrow but blunt continuous pressure ring. Ring 36 has a width B that is wider than furrow 32 or chisel 25. Width B is necessary to allow ring 36 to press down the floor of the furrow adequately because chisel 25 rips and breaks up the soil laterally. The radially outer area of the ring is made out of a hard material in order to reduce wear.

The sides 38 of narrow ring 36 are initially at least approximately parallel and then taper together as they extend radially outward from the bearing surface 35 of roller 7 to form wedge-shaped contour 37. The angle a between the two tapering surfaces 39 of ring 36 is between 40° and 120° and preferably 90°. The tapering surfaces 39 of ring 36 are straight. The sharper the tapering surfaces 39, the less upper material will be pressed down.

The position of the rear outlet 30 of sowing share 1 along direction 20 of travel can be varied in order to control how far the material flowing out of it emerges behind forward outlet 29 and thus achieve a desired separation of seed and fertilizer in accordance with the particular conditions and type of application. This is done by shifting the position of the bottom of a slanting partition 40 inside main share section 26 backward or forward in a way that is not illustrated.

Figure 3:
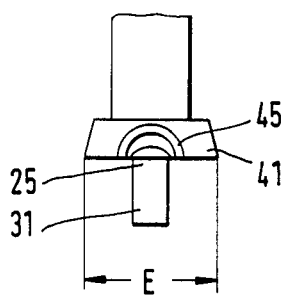
FIG. 3 is a view along the line III—III of the share with an expansion structure.

An expansion structure 41 is positioned on each sowing share 1 between the forward 29 and rear outlet 30 and in the vicinity of rear outlet 30. Expansion structure 41 is somewhat wider than rip-up structure, which is in the form of a chisel 25, on sowing share 1, and the bottom of expansion structure 41 terminates higher than the point 31 of the chisel. Expansion structure 41 also has, as will be evident from FIGS. 3 and 4, its greatest width A at its base Expansion structure 41 is mounted on the walls 43 of main share section 26 by means of a bolt 42 and can easily be removed therefrom. There is armor 44 on the edge of expansion structure 41 that faces the direction 20 of travel. An impact structure 45 that is narrower than expansion structure 41 is mounted on the rear of the expansion structure.

Conductors 47 are mounted inside the main section 26 of each sowing share 1 below the two inlets 46 of the separate channels 27 and 28 to forward 29 and rear outlet 30. Conductors 47 are employed as disclosed in German Patent Application No. P 3 332 352 to divert material from forward outlet 29 to rear outlet 30 or vice versa in such a way that materials supplied separately to the inlets 46 to sowing share 1 can be conveyed as desired in accordance with the position of conductors 47 to forward outlet 29 or rear outlet 30 through separate channels 27 and 28 either separately or together. Thus, conductors 47 can be positioned to supply seed 33 to forward outlet 29 and fertilizer 34 to rear outlet 30 or fertilizer 34 to forward outlet 29 and seed 33 to rear outlet 30 as the case may require.

How the seed and fertilizer are deposited in the furrow will now be described with reference to FIGS. 4 to 7.

Figure 4:
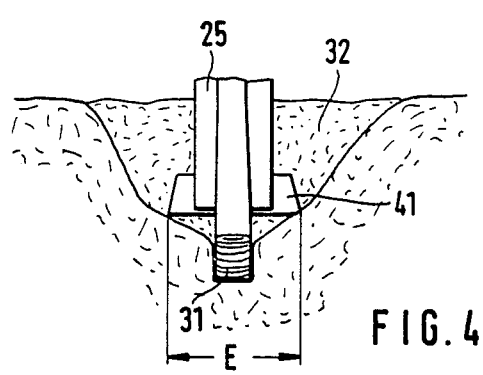
FIG. 4 is a view along the line IV—IV of the share with an expansion structure.
Figure 5:
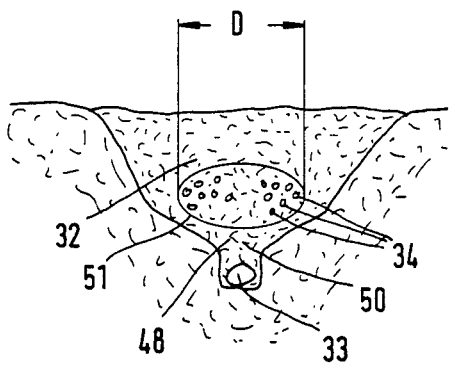
FIG. 5 illustrates how the share deposits seed and fertilizer in a furrow.

Sowing share 1 rips the furrow 32 illustrated in FIG. 4 in soil 8. Since the soil is also broken up to the side of sowing share 1, furrow 32 will be wider than the share. A narrow strip of seed 33 is deposited on the floor of furrow 32 through forward outlet 29. Furrow 32 collapses as the soil forced out by chisel 25 flows back into the furrow. Soil 48 is at least to some extent forced to flow back into the furrow by expansion structure 41, which pushes soil 49 along in front of it and ensures that the seed deposited on the floor of furrow 32 will be covered with soil 50. Ribbons 51 of fertilizer 34 are then deposited on top of soil 50. Fertilizer 34 drops out of the rear outlet 30 of each sowing share 1 onto impact structure 45, which separates the fertilizer flowing out of rear outlet 30 into two ribbons 51. Thus, the fertilizer is deposited on top of the soil flowing back into furrow 32 as illustrated in FIG. 5.

Figure 6:
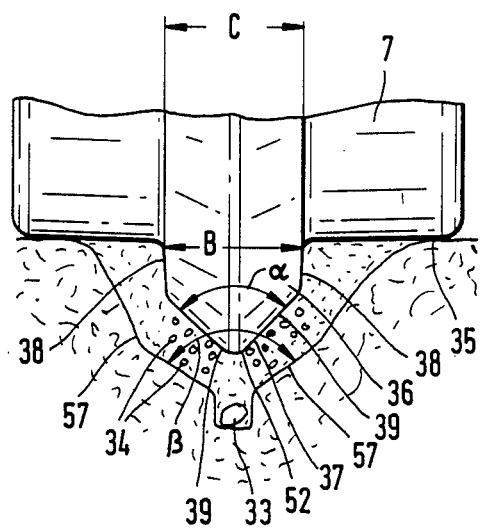
FIG. 6 illustrates how the roller presses the material down.
Figure 7:
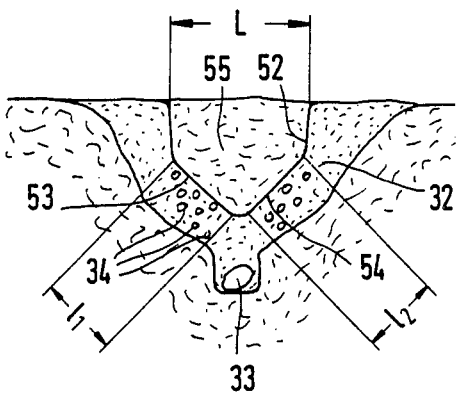
FIG. 7 illustrates the stage subsequent to smoothing soil over the groove.

The ring 36 around roller 7 now presses a groove 52 in the soil in furrow 32 in such a way that, as illustrated in FIG. 6, the soil along the midplane of furrow 32 will be pressed down farther than the soil at the edges of the furrow. Thus, length $l_1+l_2$, which equals the combined widths of the areas 53 and 54 pressed down by tapering surfaces 39, will be greater than length L, which is a projection of the width B of ring 36 and represents the width of groove 52. The ring 36 mounted on the bearing surface 35 of roller 7 will, because of its wedge-shaped contour, press groove 52, which is narrower at the bottom, into the soil in furrow 32 in such a way that the fertilizer 34 deposited on the soil in the furrow will be pressed down and somewhat to the side by ring 36. The width of the fertilizer 34 deposited in furrow 32 on top of seed 33 and forced down will be greater than the width of the chisel 25 on sowing share 1 and the pressed down areas 53 and 54 will become shallower toward the edges of the furrow. Pressing the soil in furrow 32 by means of ring 36 will also press down the seed 33 deposited on the floor of the furrow against the moisture layer of soil, providing the seed with optimal germinating and sprouting conditions. The fertilizer will also be pressed against the soil and be provided with good soil contact. The fertilizer 34 embedded in the soil in a ribbon above the seed 33 in furrow 32 will be pressed down and somewhat to the side by the ring 36 in the midplane in such a way that the sprout will only have to penetrate through a thin pressed-down layer of soil containing only a little fertilizer because almost all of the fertilizer will be situated at the sides and in the areas 53 and 54 that are pressed down at an angle. Loose soil 55 behind roller 7 and containing no fertilizer will be raked into groove 52 as illustrated in FIG. 1 by a smoothing structure in the form of a comb 56. The sprout will be able to penetrate this loose soil very easily.

Thus, ring 36 presses the soil around and on top of seed 33 without entraining too much fertilizer 34 too close to the seed. The wedge-shaped contour of ring 36 presses the deposited fertilizer 34 into a V-shaped distribution.

The edge angle a of ring 36, which more or less equals the cross-sectional angle b of the furrow, allows ring 36 to press the soil into furrow 32 uniformly. The angle a between the two tapering surfaces 39 of ring 36 equals the angle b between the two walls 57 of the furrow 32 thrown up by sowing share 1. The width C of ring 36 is wider than the width D of the ribbons 51 that the upper material is deposited in furrow 32 in.

Figure 8:
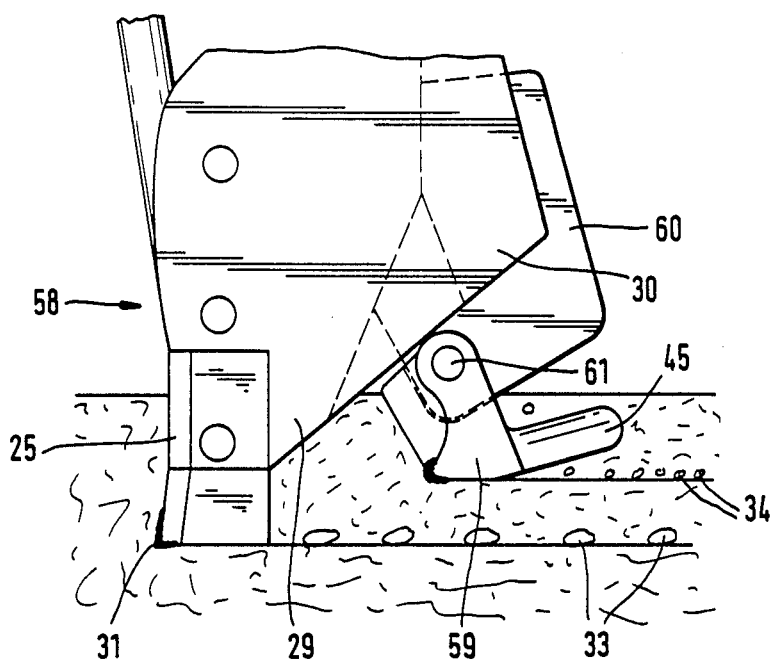
FIG. 8 is a side view of part of another share.
Figure 9:
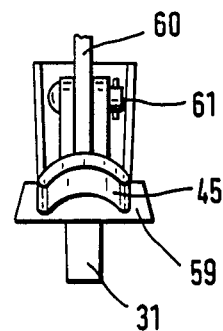
FIG. 9 is a rear view of part of the share illustrated in FIG. 8 with an expansion structure.

The sowing share 58 illustrated in FIGS. 8 and 9 differs from the sowing share 1 illustrated in FIG. 2 only in the way expansion structure 59 is mounted on it. There is a partition 60 that extends along the direction 20 of travel positioned in the rear outlet 30 of sowing share 58. Expansion structure 59 is mounted on partition 60 with a bolt 61 in such a way that it can be removed from the partition. An impact structure 45 is positioned on the rear of expansion structure 59. Seed 33 and fertilizer 34 are deposited and expansion structure 59 functions as described with reference to FIGS. 1 to 7.

Figure 10:
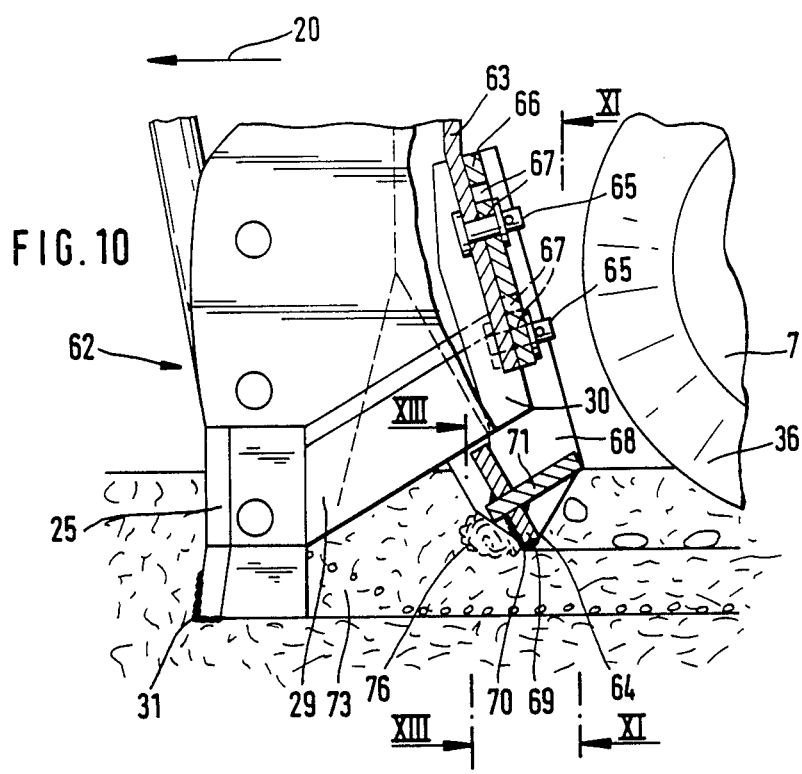
FIG. 10 is a partly sectional side view of part of another share.
Figure 11:
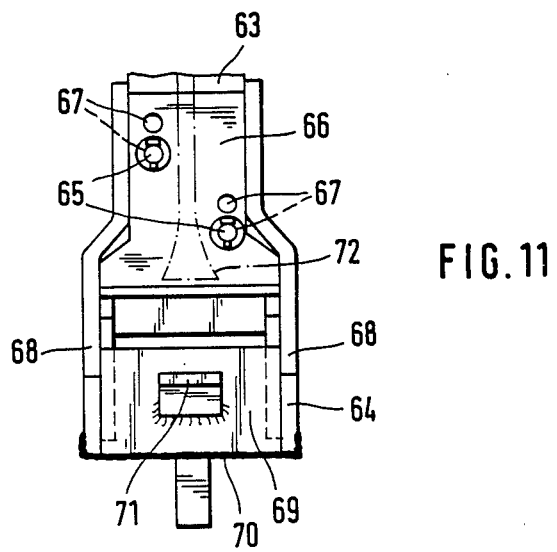
FIG. 11 is a view along line XI—XI of the share with an expansion structure.

The sowing share 62 illustrated in FIGS. 10 and 11 is designed like the sowing share 1 illustrated in FIG. 2. An expansion structure 64 is fastened to the rear wall 63 of the rear outlet 30 of sowing share 62 with two bolts 65. Expansion structure 64 has a retainer 66 with a vertical row of bores 67 that allow the structure to be positioned at different heights on the share in relation to the point 31 at the bottom of chisel 25. Fenders 68 that extend down and along the direction 20 of travel are welded to each side of retainer 66. A smoothing plate 69 is welded between the bottoms of fenders 68. Smoothing plate 69 has armour 70 on the bottom and at the bottom of the side that faces along the direction 20 of travel. A impact structure 71 is fastened, to the rear of smoothing plate 69. The bottom of smoothing plate 69 terminates above the point 31 at the bottom of chisel 25. Thus, expansion structure 64 is situated on sowing share 62 between forward outlet 29 and rear outlet 30 and in the vicinity of outlet 30.

In order to break up the material flowing out of rear outlet 30 into two separate streams, a partition 72 that is wider at the bottom and that is illustrated with dot-and-dash lines in FIG. 11 can be positioned in rear outlet 30. It is also possible for this partition 72 to be positioned on expansion structure 64 in such a way that it can be removed along with expansion structure 64 from sowing share 62 and replaced with another. The shapes of impact structure 71 and partition 72 can be designed in relation to each other to ensure that the material is deposited in the furrow as desired.

How the seed and fertilizer is deposited in the soil with sowing share 62 will now be described with reference to FIGS. 12 to 16.

The chisel 25 on sowing share 62 cuts a furrow 73 in the soil, with the soil breaking up inside the furrow along walls 74. The conductors 47 described with reference to FIG. 1 are positioned in such a way that fertilizer 34 is supplied to the forward outlet 29 of sowing share 62 and seed 33 to rear outlet 30. Fertilizer 34 is deposited on the floor of furrow 73 behind chisel point 31 through forward outlet 29 and illustrated in FIGS. 10 and 11. Once the fertilizer 34 has been deposited on the floor of the furrow, the smoothing plate 69 on expansion structure 64 forces soil 75 into the narrow bottom of furrow 73, covering the fertilizer 34 deposited on the floor with a layer of soil. Expansion structure 64 also separates a little soil from furrow wall 74 at each side. Smoothing plate 69 always pushes a little loose soil 76 ahead of it in order to reliably cover up the material deposited on the floor of furrow 73 with soil. Behind the smoothing plate 69 on expansion structure 64, seed 33 is deposited on soil 75, and on the soil flowing back into the furrow, through rear outlet 30.

The ribbon of seed 33 deposited in furrow 73 from rear outlet 30 is at least 3 cm and preferably 5 cm wide. Ring 36 is in the shape of a V and at least approximately as wide as the ribbon of material from rear outlet 30. The material deposited on the floor of furrow 73 is deposited in a preferred narrow row.

The soil is now pressed into furrow 73 by the ring 36 on pressure roller 7 as illustrated in FIG. 15. Ring 36 presses a wedge-shaped groove 77 into furrow 73, pressing down the soil more or less uniformly in such a way that both the seed and the fertilizer are in satisfactory contact with the soil. The seed 33, which is separated into two ribbons by impact structures 71, is pressed into even more of a V-shaped distribution on each side of fertilizer 34, which lies along the midplane and on the floor of the furrow.

Once the ring 36 on roller 7 has pressed the soil into furrow 73, a comb 56 like that illustrated in FIG. 1 rakes soil 79 into groove 77, completely filling furrow 73 with soil.

Figure 17:
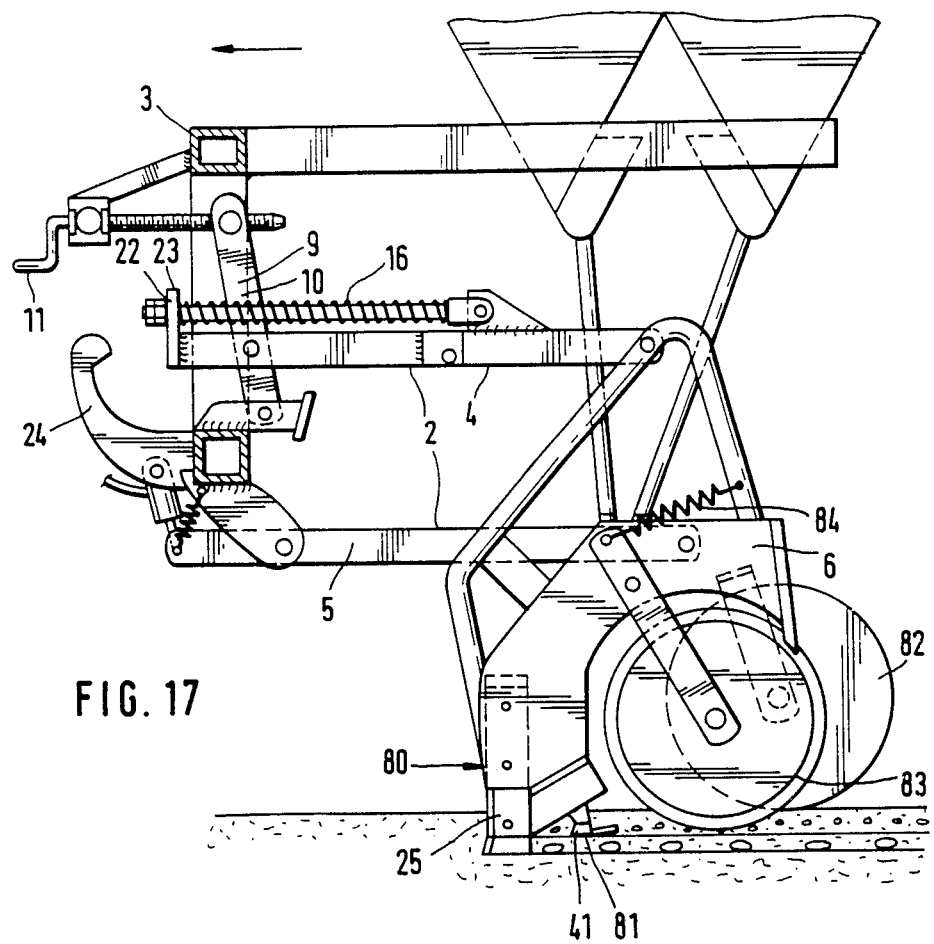
FIG. 17 is a side view of another embodiment of a sowing share mounted on a seed drill in accordance with the invention with a wedge-shaped ring roller and a depth-guide roller.
Figure 18:
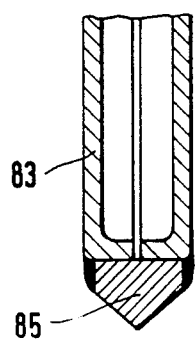
FIG. 18 is a sectional rear view of part of the wedge-shaped ring roller illustrated in FIG. 17.

The sowing share 80 illustrated in FIG. 17 differs, from the sowing share 1 illustrated in FIG. 1 only in the design of the depth-guide or pressure roller. A depth-guide roller 82 is positioned next to sowing share 80, next that is to the furrow 81 created by sowing share 80. A wedge-shaped ring roller 83 is articulated to the rear of sowing share 80 in the vicinity of furrow 81. A tension spring 84 forces roller 83 against the soil. Thus, wedge-shaped ring roller 83 functions independently of depth-guide roller 82. Ring roller 83 consists of two halves pressed out of sheet metal. A wedge-shaped ring 85 extends around the supporting surface of the ring roller and is welded to the rear half. The ring presses down on the soil in the furrow and on the materials, such as seed and fertilizer, deposited in the furrow as previously described herein.

Figure 19:
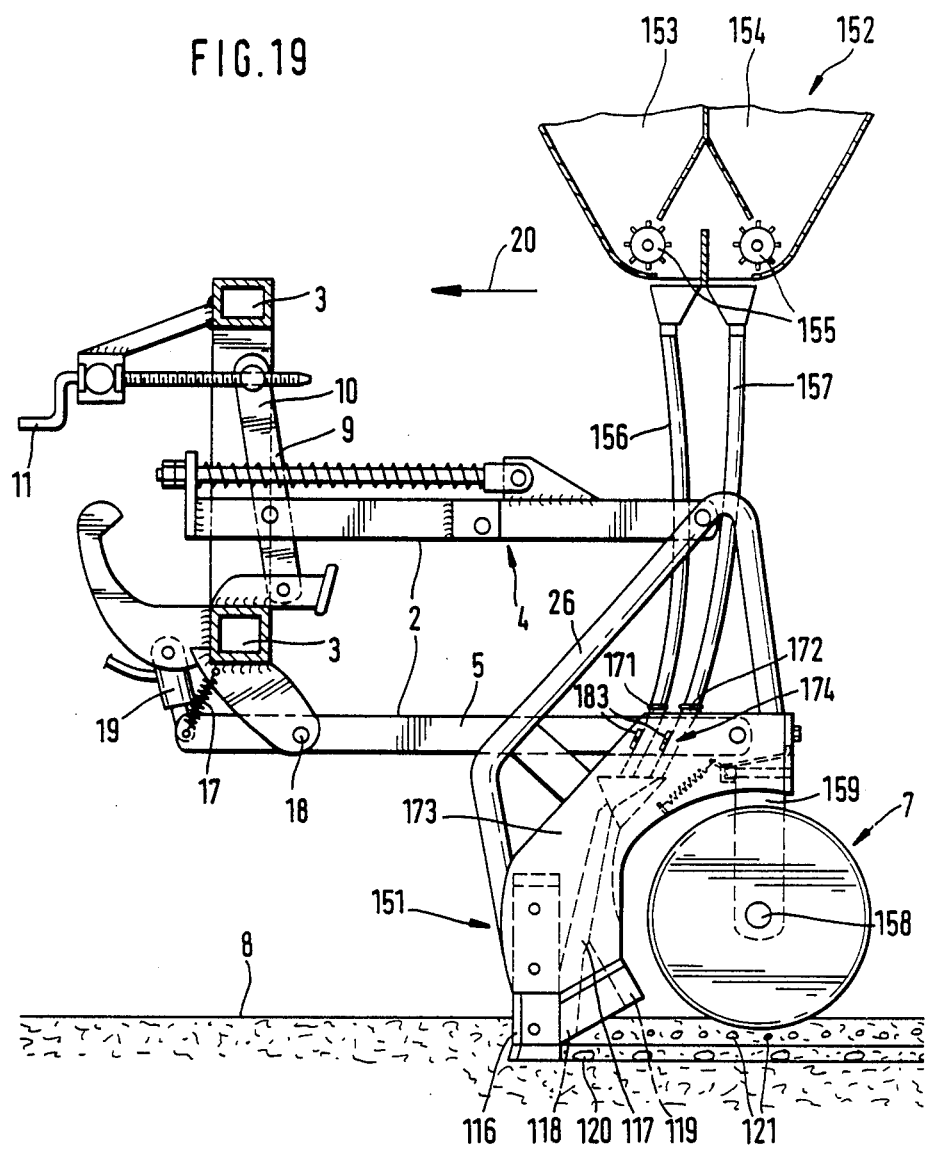
FIG. 19 is a side view of another seed drill with a sowing share in accordance with the invention mounted on it.
Figure 22:
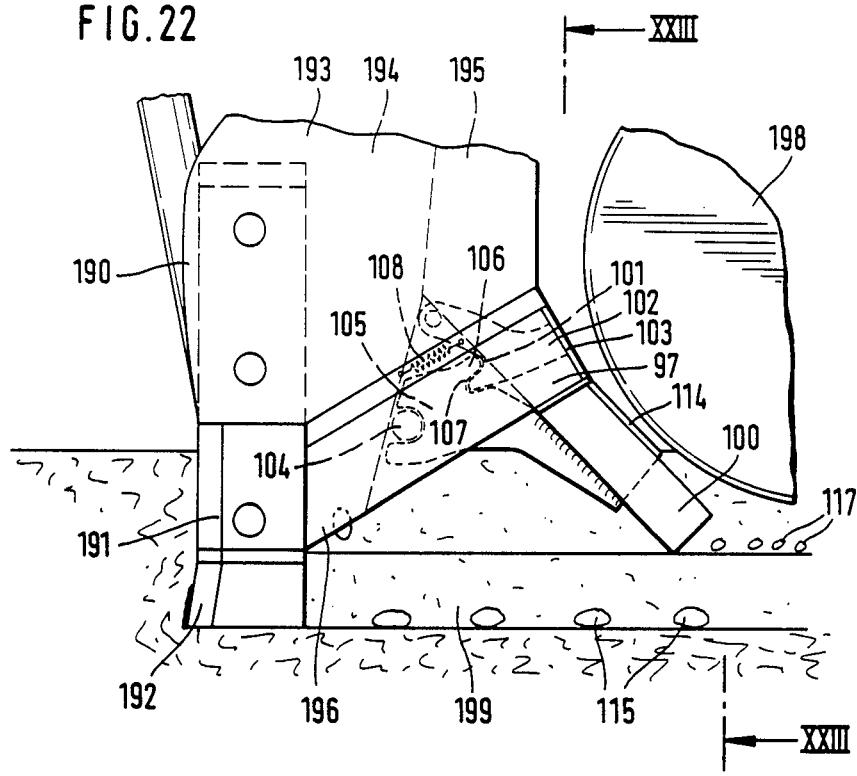
FIG. 22 is a side view of a share in accordance with the invention with an extension for the rear outlet.

The sowing share 151 illustrated in FIGS. 19, 20, and 21 has separate inlets 171 and 172. Conductors 174 are positioned below inlets 171 and 172 inside main share section 173 between a reservoir unit 152 and outlets 118 and 119. Conductors 174 are the ends of supply hoses 156 and 157 that can be shifted back and forth into at least two positions by means of controls 175 and 176.

A vertical partition 177 is positioned below conductors 174 and between inlets 171 and 172 and outlets 118 and 119 inside main share section 173. The top of partition 177 is in alignment with a line that connects the centers of inlets 171 and 172. Partition 177 creates two separated supply shafts 178 and 179 belows conductors 174. Supply shaft 178 communicates with the forward outlet and supply shaft 179 with the rear outlet. Thus, material can be conveyed to either outlet 118 or outlet 119 over conductors 174 as desired.

The ends of supply hoses 156 and 157 are in the form of pipes 180 and 181. The ends of the hoses are pulled over the top of the pipes and secured with a collar 182. There are two slots 183 in main share section 173. Controls in the form of a disk-shaped lever 184 pivot around an eccentric point 187 on each pipe 180 and 181. Lever 184 rests against the inner surface 185 of main share section 173. Each of the contact surfaces 186 of lever 184 is at a certain distance from the lever's point 187 of rotation. Unillustrated are positioned between lever 184 and pipes 180 and 181 to secure the lever in position.

A pin 188 is an integral part of lever 184. The lever pivots on this pin. Pivoting the lever around the pin will pivot pipes 180 and 181 to one side or the other inside main share section 173 in such a way that all or part of the seed 120 supplied to pipe 180 will be conveyed to supply shaft 178 or 179 and hence to outlets 118 or 119 as desired.

Lever 184 and pin 188 are mounted in such a way and supply shafts 178 and 179 communicate with outlets 118 and 119 in such a way that the pin will indicate what material is being deposited. When lever 184 is positioned in such a way that pin 188 is at the top, it indicates that the material that flows through the pipe that the pin is associated with is being deposited at the top of the furrow. When the pin is at the bottom, it indicates that the material is being deposited at the bottom of the furrow.

The edge of sowing share 119 that faces the direction of travel has a ripping structure 191 with a share 190 are separate channels 194 and 195. Channel 194 ends in the forward outlet 196 of sowing share 190 and channel 195 in rear outlet 197. Behind sowing share 190 is a pressure roller 198. A furrow 199 is drawn in the soil by ripping structure 191 and ripping point 192.

Rear outlet 197 has a extension 100 that extends down into furrow 199 and that can be removed. Extension 100 is attached to sowing share 190 with a rapid release 101 in the form of a snap connection. The lever 102 that activates the connection is constituted by the bottom rear 103 of main share section 193. Snap connection 101 is positioned as high as possible at the bottom of main share section 193 to leave as much empty space as possible between forward outlet 196 and rear outlet 197 and prevent the forward outlet from getting blocked up. There is a bolt 104 in main share section 193. The front of the retainer 105 that secures snap connection 101 slips over this bolt. The rear of retainer 101, which is welded to the extension 100 on the rear outlet, has a nose 106 and an elevation 107, which the stop on activating lever 102 is shaped to engage. Activating lever 102 is welded into the rear of the main share section. A tension spring 108 is positioned between activating lever 102 and main share section 193, forcing lever 102 against the retainer 105 on extension 100. The bottom of extension 100 extends beyond the wall 109 of main share section 193 and the wall 110 of the ripping structure 191 on sowing share 190 at one side. One side of extension 100 slopes out in a wall 111 that extends beyond the ripping structure at one side. At least the top of extension 100 is approximately as wide as rear outlet 197. The sloping outer wall 112 of extension 100 terminates at a distance V from the bottom 113 of extension 100. Distance V is at least one third of the length W of extension 100. There is a cover 114 on the rear of extension 100 that extends about half of length W. The bottom of extension 100 is to one side of forward outlet 196 along the direction of travel.

How the rear outlet functions will now be described.

The ripping structure 191 and ripping point 192 on sowing share 190 draw a furrow 199 in the soil. Forward outlet 196 deposits seed 115 on the floor of the furrow directly behind ripping point 192. The soil is thrown up along a predetermined line 116. The bottom of rear outlet 100 causes the solid soil on each side of line 116 to be more or less raked. Rear outlet 197 or the rear of extension 100 deposits fertilizer 117 to one side of and above the seed in furrow 199. Pressure roller 198 presses soil into the furrow along the deposited seed 115 and fertilizer 117.

Figure 23:
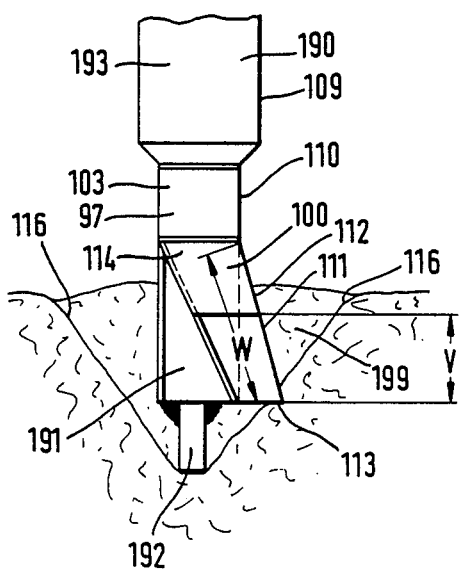
FIG. 23 is a view along line XXIII—XXIII of the share, illustrated in FIG. 22.
Figure 24:
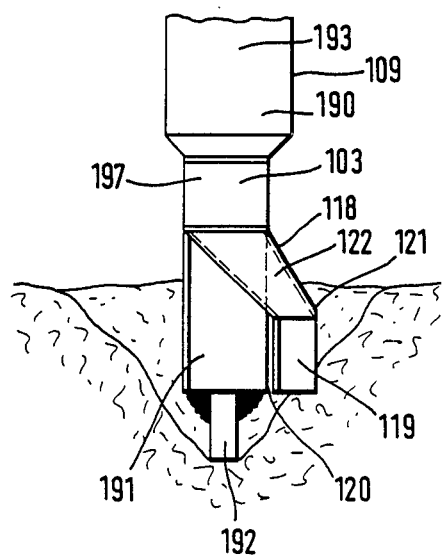
FIG. 24 is a view similar to FIG. 23 of another version of an extension for the rear outlet of the share illustrated in FIG. 22.

The extension 118 illustrated in FIG. 24 differs from the extension 100 illustrated in FIG. 23. Extension 118 is also positioned below rear outlet 197, creating an extension of the outlet. Since the bottom 119 of extension 118 is to one side of the wall 109 of the main section 199 of share 190 or to one side of the wall 120 of ripping structure 191, the bottom 119 of extension 118 extends beyond both main share section 193 and ripping structure 191 at one side. Ripping structure 191 is also fastened to the sowing share 190 with a rapid release 101. The outer wall 121 of extension 118 also terminates at a distance from the bottom of the extension. This distance is about half the length of the extension. The rear of extension 118 also has a cover extending half its length.

It will be appreciated that the instant specification and claims are set forth by way of illustration and not limitation, and that various modifications and changes may be made without departing from the spirit and scope of the present invention.

What is claimed is:

1. In a seed drill having a frame, reservoirs for materials, means mounting the sowing shares on the frame including parallelogram holders, at least two separate inlets and outlets for the two different materials from the reservoirs, and a pressure roller behind each sowing share along the direction of travel, and wherein variable amounts of first material are conveyed to a forward outlet and of the second material to a rear outlet through separate channels inside the sowing shares for application in the soil, with the outlets separated along the direction of travel, and wherein each sowing share has a narrow ripping structure on the lower edge thereof to rip up the soil and produce a furrow having side edges, the improvement comprising: means for expanding the side edges of the furrow, said means including an upwardly extending portion received within downwardly opening recess in each sowing share, and removable transverse in means extending through said upwardly extending portion to releasably mount said expanding means, said expanding means extending down into the furrow and positioned in the vicinity of the rear outlet of each sowing share, wherein the expanding means is wider than the ripping structure and has a bottom end which is higher than the bottom of the ripping structure and wherein the means for expanding when mounted is positioned to effect the deposit of second material from the rear outlet on top of the first material with soil therebetween in a wider ribbon-like distribution than the first material and when removed permits the second material to be deposited directly on top of the first material.

2. The seed drill as in claim 1, wherein the greatest width of the expanding means is at the bottom thereof.

3. The seed drill as in claim 1, wherein the expanding means has an armored bottom forward edge.

4. The seed drill as in claim 1, further comprising an impact member mounted on the rear of the expanding means and impacted by material from the reservoirs.

5. The seed drill as in claim 4, wherein the impact member is narrower than the expanding means.

6. The seed drill as in claim 1, further comprising a fender extending along the direction of travel and mounted on each side of the expanding means.

7. The seed drill as in claim 1, further comprising a partition extending along the direction of travel and mounted inside the rear outlet.

8. The seed drill as in claim 7, wherein the partition tapers outward from top to bottom to form two separate rear outlets at a slight distance apart.

9. The seed drill as in claim 8, wherein the separate rear outlets slope at least slightly outward.

10. The seed drill as in claim 7, wherein the partition is mounted on the expanding means.

11. The seed drill as in claims 3, further comprising a partition extending along the direction of travel and mounted in the rear outlet and on the expanding means for removal therewith.

12. The seed drill as in claim 11, wherein the separate rear outlets slope at least slightly outward.

* * * * *

UNITED STATES PATENT AND TRADEMARK OFFICE
CERTIFICATE OF CORRECTION

PATENT NO. : 4,726,304

DATED : February 23, 1988

INVENTOR(S) : Heinz Dreyer, et al

It is certified that error appears in the above-identified patent and that said Letters Patent is hereby corrected as shown below:

Title Page, Abstract, line 7  After "application" delete "of" and substitute --in--

Col. 5, line 15  Delete "again" and substitute --main--

Col. 11, line 57  After "with a" insert --ripping point 192. Inside the main section 193 of sowing--

Col. 13, line 10, "in" should be --pin--.

Signed and Sealed this

Fifteenth Day of November, 1988

Attest:

DONALD J. QUIGG

Attesting Officer

Commissioner of Patents and Trademarks